US006383975B1

(12) United States Patent
Rocha et al.

(10) Patent No.: US 6,383,975 B1
(45) Date of Patent: May 7, 2002

(54) PROCEDURE TO OBTAIN A CATALYST FOR THE HYDRODENITROGENATION AND HYDRODESULFURIZATION OF MIDDLE AND HEAVY OIL FRACTION AND THE RESULTING PRODUCT

(75) Inventors: Ernesto Galvan Rocha; Tomás Alberto Beltrán Oviedo, both of Deleg. Gustavo A. Madero; Teresa de Jesús Cortez de la Paz, Deleg. Cuauhtemoc; Blanca Lucía Medellín Rivera, Los Reyes la Paz; René Zárate Ramos, Deleg. Azcapotzalco., all of (MX)

(73) Assignee: Instituto Mexicano del Petroleo, Mexico City (MX)

( * ) Notice: Subject to any disclaimer, the term of this patent is extended or adjusted under 35 U.S.C. 154(b) by 0 days.

(21) Appl. No.: 09/345,476

(22) Filed: Jul. 1, 1999

(30) Foreign Application Priority Data

Jul. 7, 1998 (MX) .............................................. 985494

(51) Int. Cl.[7] .......................... B01J 23/00; B01J 23/32; C10G 11/00
(52) U.S. Cl. ....................... 502/309; 502/308; 502/324; 502/349; 502/350; 502/351; 208/113
(58) Field of Search ................ 502/308, 309, 502/349, 350, 324, 351; 208/113

(56) References Cited

U.S. PATENT DOCUMENTS

| | | | | |
|---|---|---|---|---|
| 3,686,340 A | * | 8/1972 | Patrick et al. | 260/672 R |
| 4,018,714 A | * | 4/1977 | Wilson et al. | 502/309 |
| 4,105,587 A | * | 8/1978 | Blakely | 502/219 |
| 4,196,101 A | * | 4/1980 | Wilson et al. | 502/221 |
| 4,278,566 A | * | 7/1981 | Hensley, Jr. et al. | 252/465 |
| 4,459,372 A | * | 7/1984 | Arena | 502/351 |
| 4,465,790 A | * | 8/1984 | Quayle | 502/309 |
| 4,665,048 A | | 5/1987 | Van Leeuwen et al. | 502/221 |
| 4,769,129 A | | 9/1988 | Barbou Des Courieres et al. | 208/215 |
| 4,780,193 A | | 10/1988 | Derr, Jr. et al. | 208/89 |
| 4,886,594 A | | 12/1989 | Miller | 208/210 |
| 5,009,768 A | | 4/1991 | Galiasso et al. | 208/89 |
| 5,089,247 A | * | 2/1992 | Liu et al. | 423/600 |
| 5,246,569 A | | 9/1993 | Heinerman et al. | 208/216 R |
| 5,444,033 A | * | 8/1995 | Usui et al. | 502/315 |
| 5,962,367 A | * | 10/1999 | Shen et al. | 502/439 |
| 6,007,700 A | * | 12/1999 | Alario et al. | 208/139 |

FOREIGN PATENT DOCUMENTS

EP 199399 A2 * 10/1986 ............ B01J/21/04

* cited by examiner

Primary Examiner—Mark L. Bell
Assistant Examiner—Patricia L. Hailey
(74) Attorney, Agent, or Firm—Roylance, Abrams, Berdo & Goodman, L.L.P.

(57) ABSTRACT

A procedure to prepare a catalyst for the hydrodenitrogenation, hydrodesulfurization and hydrodemetallization of middle and heavy oil fractions. The catalyst uses a support consisting on an alumina matrix, having this matrix dispersed on its surface or in its mass, or in both, a metal oxide from group IVB of the periodic table. The support is prepared by co-precipitation technique, co-gelification or impregnation of the alumina with a Ti compound, soluble in an organic solvent, followed by drying at 100 to 200° C. and a calcination at 400 to 600° C., on oxidizing atmosphere. Impregnation of the support proceeds using an aqueous solution with spray-impregnation technique, after which, the support is left for aging for a period of 1 to 12 hrs. The impregnated support is then dried at a temperature of 110 to 200° C., for a period of 1 to 8 hrs. Finally, calcination takes place in oxidizing atmosphere at a temperature between 400 and 600° C. for a period of time of 2 to 6 hrs.

24 Claims, No Drawings

PROCEDURE TO OBTAIN A CATALYST FOR THE HYDRODENITROGENATION AND HYDRODESULFURIZATION OF MIDDLE AND HEAVY OIL FRACTION AND THE RESULTING PRODUCT

FIELD OF THE INVENTION

The present invention relates to a procedure for the preparation of a new catalyst with application in hydrodenitrogenation and hydrodesulfurization of middle and heavy petroleum distillates. The catalyst object of the present invention is basically constituted by active metals and promoters, whose elements belong to groups VIII, VI, IVB of the periodic table, with specific properties for hydrodenitrogenation and hydrodesulfurization of middle and heavy petroleum oil fractions.

BACKGROUND OF THE INVENTION

It is a fact that an urgent need exists to improve the surrounding ecology, which has been deteriorated by the past generations common practices. It is not until now, the second half of the second millennium, that people are aware of the damage caused to life and living species. Industries tend to be modernized and to establish cleaner production systems. In the same way, the refining industry is focused in producing cleaner fuels with higher quality and with minimum contents of contaminants such as sulfur, nitrogen and heavy metals. However, as the ecological regulations become more strict each day, it is urgent to have processes as well as catalysts performing more efficiently and at the same time able to comply with the new requirements.

Without any doubt, hydrotreating processes are industrially considered the most efficient in contaminants removal and are used for mostly all crude fractions such as gasolines, diesel, vacuum distillates and residues. In order to achieve maximum hydrodesulfurization, hydrodenitrogenation and hydrodemetallization at the given process conditions, it is necessary using catalysts with high activity and selectivity to these reactions. A given process operating with a particular catalyst having such characteristics, will not only remove nitrogen, sulfur and metals, but will improve other fuel properties such as color, stability to gum formation, etc.

The present invention relates to a procedure to prepare a new catalyst that is highly active and selective for hydrodenitrogenating middle and heavy oil fractions, and additionally provides a high hydrodesulfurization and hydrodemetallization capacity. This invention also relates with the process conditions for its industrial application.

Catalyst activity and selectivity is determined and affected by such factors as the nature and properties of the catalyst support, the catalytic agents, activity and selectivity promoters, as well as the preparation and activation method used.

Current catalysts in hydrotreating processes, namely, hydrodesulfurization, hydrodenitrogenation and hydrodemetallization of oil fractions incorporate metals from groups VIII and VIB of the periodic table, and are usually supported on metallic oxides such as alumina, silica or silica alumina. Occasionally, secondary promoters or additives are used such as halogens, phosphorous, borum, etc., enhancing the catalytic properties mainly for a dispersing effect on the active phase or the modifications resulting in the support's physical and chemical properties.

Catalyst support properties play an important role in the catalytic activity. The first generation of catalyst supports had as their only function supporting or containing the active agents. During the 1970's, studies developed on properties and effects of catalytic supports revealed that these could be designed for specific uses.

The support is generally a porous solid constituted by metallic oxides such as gamma alumina, delta alumina, etc.; silica, silica-alumina, titania, titania alumina; among others. A catalyst support used for hydrotreating catalysts can have different geometric forms, such as spheres, pellets, cylindrical extrudates, trilobular and tetralobular forms, etc., and also different sizes going from nominal sizes of $\frac{1}{30}$ to $\frac{1}{8}$ inch.

The method used to prepare catalysts also affects final catalyst activity and selectivity. Of the different methods used for preparing catalysts, (sol-gel, co-precipitation, etc.); the most efficient method known is support impregnation with a solution or solutions containing the active metals and/or promoters and/or additives. In this case, solutions must be very stable to prevent precipitation during impregnation stage and inside the matrix pores. It is necessary that the elements present in the solution be adsorbed and selectively distributed on both internal and external surface preventing its agglomeration.

U.S. patents relating to these procedures are the following:

U.S. Pat. No. 4,665,048 relates to a catalyst for hydrotreatment of oil and its fractions prepared by impregnation of ammonia solutions containing metals from groups VIII and VIB; and anions free derived from strong acids, followed by a drying and a calcination.

U.S. Pat. No. 4,769,129 relates to a method to hydrotreat hydrocarbon feeds using a catalyst containing vanadium sulfide prepared either in situ or outside the reaction zone. This method can be applied to gasolines, gas oils and residues for hydrotreatment, removing sulfur, nitrogen and metals.

U.S. Pat. No. 4,780,193 describes a process for hydrotreating catalytic cracking feeds at temperatures lower than 390° C. and pressures higher than 12,000 KPa, which improves cracking of feeds to produce high octane gasolines. Desulfurization taking place with this process, reduces $SO_x$ emissions on the catalytic cracking system, and also hydrodenitrogenation takes place as result of the high pressures used.

U.S. Pat. No. 4,886,594 relates to a catalyst formulation consisting on a hydrogenating agent, being a metal from group VIB of the periodic table and phosphorous component, laid on the surface of the support which is a refractory inorganic oxide, free from any zeolitic components. This catalyst is specially used for hydrodenitrogenation and hydrodemetallization of high sulfur content feeds.

U.S. Pat. No. 5,009,768 describes an invention relating to a hydrocatalytic process for vacuum gas oil hydrotreatment, residual feed or a combination of these, in the presence of 100 ppm V and Ni, at moderate partial pressures. The process consists in two or more stages using feed demetallization at levels lower than 10 ppm vanadium and nickel, and hydrodenitrogenation and hydroconversion by means of a combined catalyst bed. The hydrotreated product is then submitted to a catalytic cracking to obtain gasolines.

U.S. Pat. No. 5,246,569 discloses a process and a catalyst for hydrocarbons hydrodesulfurization. The catalyst is prepared by impregnation to achieve 0.3 to 3 weight percent of $P_2O_5$; 4.5 to 6 weight percent of CoO and 19 to 23 weight percent of $MoO_5$ and which is supported on alumina. Additionally, other organic or inorganic acids are incorporated to obtain more stable solutions.

The previous described technologies have been overwhelmed by the present invention; in catalyst properties, and its preparation procedure, as well as in catalyst performance, demonstrating a superior capacity for hydrotreating middle and heavy oil fractions.

SUMMARY OF THE INVENTION

The present invention is related to a catalyst with high catalytic activity and selectivity for hydrodenitrogenation, as well as a good hydrodesulfurization and hydrodemetallization activity on petroleum oil fractions, preferably middle and heavy fractions. This catalyst is obtained by impregnation of a solution containing metals from groups VIB and VIII of the periodic table. The support used is a porous refractory oxide whose metals belong to groups IIIA, IVA of the periodic table, or its combinations. Additionally, the support includes an additive in the form of an oxide whose metal belongs to group IVB of the periodic table. The impregnated material is thermally treated in an oxidizing atmosphere.

Once the catalyst is obtained, it is activated using presulfiding methods with sulfur compounds which easily decompose to generate the corresponding metallic sulfurs.

DETAILED DESCRIPTION OF THE INVENTION

The catalyst described in the present invention is able to hydrotreat middle and heavy oil fractions, understanding that the term "hydrotreatment" includes hydrodenitrogenation, hydrodesulfurization and hydrodemetallization.

The catalyst comprises a support and metals which provide the physical and chemical properties to carry out such reactions at industrial hydrotreating conditions.

The support is formed of a refractory oxide, with alumina, silica, silica-alumina and their combinations. As the support base, it is preferably used gamma alumina, delta alumina, or a mixture of such alumina phases. The support preferably possesses specific properties of surface area, pore volume and pore volume distribution. Surface area properties range between about 180 $m^2$/gram and about 350 $m^2$/gram, preferably between about 200 $m^2$/gram and about 300 $m^2$/gram. The pore volume ranges from about 0.45 $cm^3$/gram to about 1.0 $cm^3$/gram, preferably between about 0.5 $cm^3$/gram and about 0.7 $cm^3$/gram. It is recommended to have pore volume distribution between 0% to 10% of the total pores of pores smaller than 50 Å size; 50% to 100% of the pores between 50 Å and 200 Å, and 0% to 40% of the total pores of pores larger than 200 Å, being the preferred distribution the following: pores smaller than 50 Å from 1% to 9%, 60% to 90% of pores between 50 Å and 200 Å, and 3% to 30% of pores larger than 200 Å. The average diameter resulting from this distribution is between 50 Å and 150 Å, having preferred values between 60 Å and 100 Å.

The support contains an additive to promote physical and chemical stability whose basic functions are dispersing and uniformly distributing the catalytic species with the function of promoting the hydrodenitrogenation, hydrodesulfurization and hydrodemetallization reactions of hydrocarbons constituting the middle and heavy oil fractions. This additive is formed by metals from group IVB of the periodic table such as titanium, zirconium; being preferred the use of titanium, which may be in its oxidized form as titania, in its rutile phase or anatase, or both. Titanium may be incorporated into the support by impregnation using an organic solution of a titanium compound, such as titanium butoxide in n-heptane, and under inert humidity-free conditions or by integration during support preparation either by integrating a titanium source such as titanium oxide into a bohemite binder or to pseudo bohemite or by coprecipitation.

The support may have different forms such as extrudates of various geometric forms, cylindrical or with two or more lobules; nominal sizes may range from ¹⁄₃₂ inch to ¼ inch, being preferred nominal sizes of ¹⁄₂₀ to ¹⁄₁₀ inch.

Integration of active metals is performed by impregnation of an aqueous solution. This solution is prepared in a basic or acid media.

The basic solution is prepared with a pH of 7.5 to 13, preferably of 9 to 12 based on the salts containing elements from group VIII, preferably Ni, as well as compounds containing elements from group VIB as Mo and W, preferably Mo. Metal salts from group VIII can be from nickel nitrates, nickel carbonate hydroxide tetrahydrate, nickel acetate, etc. It is recommended to use carbonate nickel hydroxide. The metal compounds used from group VIB are: ammonium molybdate, molybdic acid, molybdenum trioxide, etc.; while is better using molybdenum trioxide.

The solution is an acid media, and is prepared with pH of 1 to 6.5, preferably 1 to 5, from salts containing elements from group VIII, preferably Ni, as well as compounds containing elements from group VIB as Mo and W, preferably Mo. The metallic salts used from group VIII can be nickel nitrates, nickel acetates, etc., preferably nickel acetate. The metallic compounds used from group VIB are: ammonium molybdate, molybdic acid, molybdenum trioxide, etc., preferably to use molybdenum trioxide.

In both basic and acid solutions, an acid stabilizing agent can be introduced, preferably in acid solutions; which can be nitric acid, phosphoric acid, hydrogen peroxide, etc., preferably phosphoric acid, in the concentration necessary to keep pH in solution between 1 and 5.

Single solutions can be prepared from each of the nickel and molybdenum compounds and perform successive impregnations, each one followed by a thermal treatment involving drying at from about 100° to 300° C. and calcination at 350° to 600° C. Preferably, impregnation is performed with a solution containing all the desired elements, such as nickel and molybdenum. Impregnation can be performed by different methods such as immersing the support into the impregnating solution or by an incipient wetness with drops or spraying. Spraying is the preferred method.

Before proceeding with drying, the impregnated material must be aged for from about 1 to 24 hrs., preferably from about 3 to about 12 hrs, to assure a perfect distribution of the solution within the support porosity.

The impregnated material is then dried at temperatures of 100° to 300° C., preferably 110° C. to 200° C. for 1 to 24 hrs, preferably 3 to 12 hrs.

Once the impregnated material has been dried, calcination proceeds in oxidizing atmosphere, at temperatures between 350° and 600° C., preferably 400° to 500° C., for 1 to 12 hrs, preferably 3 to 6 hrs.

The resulting catalyst contains elements related in the following way: $TiO_2$/(Mo+Ni), atomic ratio of 0.01 to 0.6, preferably 0.3 to 0.5, Mo concentrations from 5 to 30 wt %, preferably 8–15 wt % based on total catalyst weight, and Ni concentrations from 1 to 10 wt %, preferably 1.5 to 5 wt % based on total catalyst weight. The catalyst of the present invention has a surface area of 150 to 400 $m^2$/g, preferably 170 to 300 $m^2$/g; pore volume between 0.3 to 0.9 $cm^3$/g; preferably 0.4 to 0.6 $cm^3$/g, and pore diameters go from 40 to 100 Angstroms, preferably 55 to 80 Angstroms.

Before using the resulting catalyst, prepared as indicated before, it must be activated converting the metallic oxides to sulfides by presulfiding with well known feeds and industrial conditions.

The catalyst can be used in conventional fixed bed reactors, for hydrotreating feedstocks at 40 to 15 ÅPI gravity containing total nitrogen of 50 to 3500 ppm, basic nitrogen of 10 to 1000 ppm, sulfur of 500 to 35,000 ppm and metal contents (Ni+V) of 0 to 10 ppm.

Process conditions at which feeds are hydrotreated with the present developed catalyst range from 300° to 400° C. temperature, space velocity of 0.5 to 3.0 $hr^{-1}$, pressures of 40 to 100 $Kg/cm^2$ and hydrogen/hydrocarbon ratio of 1000 to 3500 (scf/bbl).

In order to compare the catalytic activity of the catalyst of the present invention, a relative activity for each given reaction is used, and this is defined as the relation between the activity of the given catalyst and the reference catalyst. This ratio equals the corresponding of the reaction velocity constant in relation to the reaction velocity of a reference catalyst. In this way, reference activities for the total hydrodesulfurization reactions, the total hydrodenitrogenation reactions, the basic hydrodenitrogenation reactions and the hydrodemetallization, are calculated.

Following, some examples are presented, supporting what has been set forth; however, this is not implying a limitation on the scope of the invention.

EXAMPLE 1

For this example, 100 grams of alumina support, having a surface area of 256 $m^2/g$, a pore volume of 0.7 cm $cm^3/g$, a pore volume distribution as shown in Table 1 below, and an average pore diameter of 96 Å was used as starting material.

TABLE I

Alumina support used in Examples 1–3

| | |
|---|---|
| Shape | Extrudate, four lobules |
| Diameter, inches | 1/20 |
| Surface area, sq. m/g | 267 |
| Pore volume, cc/g | 0.70 |
| Pore volume distribution, % volume | |
| <50 Å | 7.9 |
| 50–100 Å | 19.3 |
| 100–200 Å | 51.2 |
| >200 Å | 21.6 |
| DRX analysis | Gamma-alumina |

Basically, the support consists of gamma alumina. The support was impregnated under inert conditions with an organic solution comprising 38.1 milliliters of titanium ethoxide in 51.9 milliliters of n-heptane. Inert conditions were created by filling an isolated chamber with nitrogen up to 1–2 atm. @ 20° C. After impregnation, the support was kept in this chamber for about eight hours. Next, it was brought to atmospheric conditions and a water saturated air flow was passed through the impregnated support for 12 hours. A drying step followed right after the air flow step. The drying temperature was set at 120° C. for 4 hours. The dried support was then calcined under an oxidizing atmosphere at 500° C. for 4 hours. The resulting support was labeled as SOP-A and its properties are shown in Table II below.

EXAMPLE 2

One hundred grams of the same alumina support described in Example 1 was used for preparing support SOP-B. The procedure was similar to that described in Example 1, except that titanium ethoxide was dissolved in 51.9 milliliters of ethyl ether as the organic solvent. The resulting properties of support SOP-B as shown in Table II, below.

EXAMPLE 3

One hundred grams of alumina of the support described in Example 1 was used for preparing support SOP-C. The procedure was the same as in Example 1 but instead of titanium ethoxide, 39.9 milliliters of titanium butoxide was used with 50.1 milliliters of n-heptane. Properties of this support are shown in Table II, below.

EXAMPLE 4

One hundred grams of the same alumina described in Example 1 was used for preparing support SOP-D. The procedure was similar to that described in Example 1, except that 48.5 milliliters of titanium isopropoxide was used as the titanium source and 41.5 milliliters of n-propane as the organic solvent. The resulting properties of support SOP-D are also shown in Table II, below.

TABLE II

| Support | SOP-A | SOP-B | SOP-C | SOP-D |
|---|---|---|---|---|
| Shape | Extrudate, four lobules | Extrudate, four lobules | Extrudate, four lobules | Extrudate, four lobules |
| Diameter, inches | 1/20 | 1/20 | 1/20 | 1/20 |
| Surface area, sq. m/g | 224 | 227 | 214.5 | 209.3 |
| Pore volume, cc/g | 0.68 | 0.69 | 0.69 | 0.65 |
| Pore volume distribution, volume % | | | | |
| <50 Å | 9.0 | 10.1 | 8.7 | 8.9 |
| 50–100 Å | 19.6 | 19.8 | 20.6 | 23.4 |
| 100–200 Å | 40.1 | 42.3 | 37.3 | 38.7 |
| >200 Å | 31.3 | 27.8 | 33.4 | 29.0 |

TABLE II-continued

| Support | SOP-A | SOP-B | SOP-C | SOP-D |
|---|---|---|---|---|
| DRX analysis | gamma-Alumina, anatase, rutile | gamma-Alumina, anatase, rutile | gamma-Alumina, anatase, rutile | gamma-Alumina, anatase, rutile |
| TiO$_2$, wt % | 6.1 | 5.9 | 6.3 | 5.7 |

EXAMPLE 5

In this example, 81.82 grams of support SOP-A was impregnated with an aqueous solution containing metals from Group VIIIB and VIB of the periodic table. The impregnated solution was prepared from 15.075 grams of molybdenum (VI) oxide and 5.01 g of nickel (II) carbonate-hydroxide-tetrahydrate added to an ammonium hydroxide solution having an ammonia concentration of 20–22 wt %. Continuous stirring and temperature between 40° C. to 60° C. was maintained for one hour. A bluish and crystalline solution was obtained and then impregnated on the support by spraying. The impregnated material was held at room conditions for 12 hours. After this time, the impregnated material was dried at 120° C. for four hours and calcined at a temperature of 450° C. under oxidizing atmosphere. The resulting catalyst (Catalyst "A") was characterized and its corresponding properties are shown in Table III, below.

TABLE III

| Catalyst | A | B | C | D |
|---|---|---|---|---|
| Shape | Extrudate Four lobules | Extrudate Four lobules | Extrudate | Trilobular Extrudate |
| Diameter | 1/20 | 1/20 | 1/10 | 1/10 |
| Surface Area, m$^2$/g | 183 | 200 | 161 | 204 |
| Pore Volume, cc/g | 0.47 | 0.52 | 0.50 | 0.5 |
| Pore Volume Distribution, % vol | | | | |
| <50 Å | 5.9 | 9.0 | 7.5 | 10 |
| 50–100 Å | 19.6 | 19.6 | 46.5 | 66 |
| 100–200 Å | 40.1 | 40.1 | 34.0 | 21 |
| 200–500 Å | 24.6 | 24.6 | 9.5 | 2.2 |
| >500 Å | 6.7 | 6.7 | 2.5 | 0.8 |
| Compact Density, g/cm$^3$ | 0.59 | 0.58 | 0.71 | 0.75 |
| Mo | 11.4 | 10.9 | 10 | 11.3 |
| Ni | 2.54 | 2.66 | 3.4 | — |
| Co | — | — | — | 2.8 |
| P | — | — | — | 1.69 |
| Ti/(MoO$_3$ + NiO) | 0.8 | — | — | — |

EXAMPLE 6

A catalyst was prepared based on the alumina support described in Example 1, without titanium, impregnating the same quantity of Mo and Ni as in Example 5, by the same preparation procedure of Example 5 except without titanium impregnation. The resulting catalyst (Catalyst "B") was characterized and its properties are shown in Table III.

EXAMPLE 7

In order to test the catalytic activity of catalyst described in Examples 5 and 6, pilot plant evaluations were performed with FCC feeds from Tula Refinery with the following properties: 22.0 ÅPI, 1340 ppm total nitrogen, 405 ppm basic nitrogen, 2.21 wt % sulfur and 0.66 ppm (Ni+V). The complete characterization of the heavy gas oil blend feed is detailed in Table IV, below.

TABLE IV

| Feed | Heavy Gas Oil Blends (Feeds for FCC) | Straight Run Light Gas Oil |
|---|---|---|
| Origin | Tula Refinery, Mexico | Tula Refinery, Mexico |
| API Gravity | 22.0 | 33.0 |
| Total sulfur, wt % | 2.21 | 1.26 |
| Total nitrogen, ppm | 1291 | 367 |
| Basic nitrogen, ppm | 500 | 142 |
| Metals (Ni + V), ppm | 1.38 | — |
| Vanadium, ppm | 1.27 | — |
| Distillation: | ASTM-D 1160 | ASTM-D86 |
| IBP | 283 | 212 |
| 10 vol % | 361 | 274 |
| 30 vol % | 413 | 299 |
| 50 vol % | 445 | 313 |
| 70 vol % | 474 | 329 |
| 90 vol % | 513 | 346 |
| 95 vol % | 529 | 361 |
| FBP | 562 | 368 |
| Kinematic viscosity at 40° C., cSt | 47.73 | 5.07 |
| Ramsbottom Carbon, wt % | 0.23 | 0.04 |
| Cetane Index | — | 50 |

First, each catalyst was loaded in the middle zone in an isothermic reactor and subsequently was presulfided by flowing through a mixture of gasoline with 0.75 wt % sulfur and hydrogen, with an hydrogen/hydrocarbon ratio of 2500 standard cubic feet per barrel. Feed and catalytic bed are preheated at 230° C. Presulfiding takes a period of 12 hrs to assure the conversion of the metallic oxides of group VIIIB and VIB to their corresponding metallic sulfurs.

Once the catalyst has been presulfided, naphtha flow is cut-off, and FCC feedstock is started. The following conditions are established: temperature 340° to 370° C., pressure 56 Kg/cm$^2$, space velocity 2 1/h, hydrogen/hydrocarbon ratio of 2500 standard cubic feet per barrel and a test time of 24 hours.

The hydrotreated product recovered from pilot plant testing of catalysts A and B were analyzed to determine total sulfur, total nitrogen, basic nitrogen and metals (Ni+V) contents. With the obtained results, a reaction velocity constant was determined according to a 1.5 kinetic order for desulfurization reaction and a kinetic order of 1.0 for the rest of the reactions. The resulting data was used to determine the relative activity of the catalysts.

The results of this evaluation are shown in Table V, below.

TABLE V

CATALYSTS "A", "B", "C" AND "D" EVALUATION RESULTS WITH FCC FEED

| Temperature ° C. | Total Sulfur Wt % | Total Nitrogen ppm | Basic Nitrogen ppm | Metals (Vanadium) ppm | Relative Activity = Kcatalyst/Kreference | | | |
|---|---|---|---|---|---|---|---|---|
| | | | | | HDS | HDNtot | HDNbas | HDM |
| *CATALYST "A"* | | | | | | | | |
| 340 | 0.591 | 871 | 345 | 0.09 | 1.56 | 1.13 | 1.41 | 2.96 |
| 350 | 0.419 | 807 | 293 | 0.06 | 1.60 | 1.15 | 1.53 | 2.86 |
| 360 | 0.286 | 740 | 233 | 0.03 | 1.64 | 1.18 | 1.65 | 2.77 |
| 370 | 0.189 | 669 | 170 | 0.02 | 1.68 | 1.20 | 1.77 | 2.69 |
| *CATALYST "B"* | | | | | | | | |
| 340 | 1.441 | 1020 | 403 | 0.58 | 0.53 | 0.90 | 1.09 | 1.14 |
| 350 | 1.249 | 1006 | 376 | 0.51 | 0.55 | 0.82 | 1.10 | 1.10 |
| 360 | 0.97 | 996 | 350 | 0.43 | 0.63 | 0.73 | 1.03 | 1.10 |
| 370 | 0.70 | 986 | 321 | 0.34 | 0.72 | 0.66 | 0.98 | 1.10 |
| *CATALYST "C"* | | | | | | | | |
| 340 | 0.920 | 866 | 447 | 0.41 | 0.92 | 1.15 | 0.42 | 1.27 |
| 350 | 0.748 | 828 | 420 | 0.33 | 0.90 | 1.09 | 0.50 | 1.24 |
| 360 | 0.592 | 789 | 384 | 0.26 | 0.86 | 1.04 | 0.57 | 1.20 |
| 370 | 0.458 | 749 | 336 | 0.20 | 0.83 | 0.99 | 0.66 | 1.17 |
| *CATALYST "D"* | | | | | | | | |
| 340 | 0.866 | 912 | 384 | 0.52 | 1.00 | 1.00 | 1.00 | 1.00 |
| 350 | 0.675 | 859 | 352 | 0.43 | 1.00 | 1.00 | 1.00 | 1.00 |
| 360 | 0.508 | 804 | 315 | 0.34 | 1.00 | 1.00 | 1.00 | 1.00 |
| 370 | 0.370 | 746 | 273 | 0.26 | 1.00 | 1.00 | 1.00 | 1.00 |

It is observed that the relative activity of Catalyst "A", prepared according to the present invention, significantly surpasses the relative activity of Catalyst "B", whose properties are similar to a conventional catalyst, which results in lower amounts of contaminants in the hydrotreated products.

EXAMPLE 8

With the objective of comparing the catalytic activity of the catalysts described in Examples 5 and 6, two commercial catalysts were evaluated, one of them defined as Catalyst "C", and a catalyst designated Catalyst "D" (IMP-DSD-11) identified in Table III. The procedure used for evaluation, as well as the type of feed the same described in Example 7. As indicated in Table V, it is observed that Catalyst "A", prepared according to the present invention, significantly surpasses commercial catalysts C and D indicated in the present example.

EXAMPLE 9

In this example, Catalyst "A" was evaluated with a lighter feed, namely, straight run light gas oil having 33.0 °API, 471 ppm total nitrogen, 127 ppm basic nitrogen and 1.26 wt % sulfur indicated in Table IV. Additionally, Catalyst "D", a commercial catalyst, was evaluated as reference. Properties of this catalyst are shown in Table III.

Catalyst "D" was loaded to the reactor and presulfided according to the procedure described in Example 7. Once the catalyst has been sulfided and the naphtha flow is stopped, flow of light gas oil starts under the following operating conditions: temperature from 340° to 370° C., pressure at 56 Kg/cm², space velocity of 2.5 1/h, hydrogen/hydrocarbon ratio of 2,500 standard cubic feet per barrel, and a test time of 24 hours.

The samples recovered from the evaluation were analyzed to determine total sulfur, total nitrogen and basic nitrogen contents. With the obtained results, a reaction velocity constant was determined according to a 1.5 kinetic order for desulfurization and 1.0 order for the rest of the reactions. The corresponding data were used to determine the relative activity of the catalysts.

Results from this evaluation are shown in Table VI, below.

TABLE VI

EVALUATION RESULTS OF CATALYSTS "A" AND "D" USING STRAIGHT RUN LIGHT GAS OIL

| Temperature ° C. | Total Sulfur ppm | Total Nitrogen ppm | Basic Nitrogen ppm | Relative Activity = Kcatalyst/Kreference | | |
|---|---|---|---|---|---|---|
| | | | | HDS | HDNtot | HDNbas |
| *CATALYST "A"* | | | | | | |
| 340 | 1579 | 318 | 74.4 | 1.16 | 1.06 | 1.03 |
| 350 | 1023 | 268 | 56.8 | 1.09 | 1.20 | 1.10 |
| 360 | 646 | 211 | 38.4 | 1.01 | 1.34 | 1.17 |
| 370 | 401 | 153 | 22.0 | 0.95 | 1.51 | 1.24 |
| *CATALYST "D"* | | | | | | |
| 340 | 1901 | 327 | 75.7 | 1.00 | 1.00 | 1.00 |
| 350 | 1143 | 289 | 61.1 | 1.00 | 1.00 | 1.00 |
| 360 | 647 | 245 | 45.6 | 1.00 | 1.00 | 1.00 |
| 370 | 367 | 200 | 30.8 | 1.00 | 1.00 | 1.00 |

It can be observed that catalyst "A" prepared according to the present invention significantly surpasses relative activity of the reference commercial catalyst "D" used for LGO hydrodesulfurization.

While several embodiments have been shown to illustrate the invention, it will be understood by those skilled in the art that various modifications and changes can be made therein without departing from the scope of the invention as defined in the following claims.

What is claimed is:

1. A process for preparing a hydrotreating catalyst for hydrodenitrogenation, hydrodesulfurization and hydrodemetallization of middle and heavy oil fractions which comprises, impregnating a group IVB metal oxide into a support comprising gamma alumina or delta alumina or a mixture thereof by contacting said alumina support in the form of an extrudate having a geometric form with a solution of a group IVB metal oxide which is soluble in an organic solvent to form a group IVB metal oxide impregnated alumina support, drying and calcining said group IVB metal oxide impregnated alumina support, impregnating said calcined group IVB metal oxide impregnated support with an aqueous solution of an active metal compound by impregnation of said group IVB metal oxide impregnated alumina support to form an active metal impregnated alumina support, aging said active metal impregnated alumina support and calcining said active metal impregnated alumina support to form a hydrotreating catalyst, said hydrotreating catalyst having a surface area between 150 and 300 $m^2/g$, pore volume between 0.4 and 0.8 $cm^3/g$, a pore volume distribution with 0–10% of the pores smalled than 50 Angstroms, 10–80% of pores between 50 and 100 Angstroms, 10–60% of the pores of 100 to 200 Angstroms, 0 to 25% of pores of 200 to 500 Angstroms, and 0 to 10% of the pores larger than 500 Angstroms.

2. The process of claim 1, wherein said porous refractory metal oxide is gamma alumina.

3. The process of claim 2, wherein said aqueous solution of an active metal compound is prepared from compounds containing elements from groups VIII and VIB of the periodic chart in an acid media, with a pH of 0 to 5 or in basic media with pH of 8 to 10.

4. The process of claim 3, wherein said impregnated support is aged for a period of from about 1 to about 12 hours, dried at a temperature between about 110° to about 200° C. for a period of from about 1 to about 8 hours and calcined in an oxidizing atmosphere at a temperature between about 400° and about 600° C. for a period of 2 to 6 hours.

5. The process of claim 3, wherein said aqueous solution of an active metal impregnating solution is prepared from compounds containing nickel and molybdenum.

6. The process of claim 3, wherein said aqueous impregnation solution is applied to said support by spraying.

7. A catalyst obtained according to the process of claim 3.

8. The process of claim 2, wherein the impregnating solution contains an acidic stabilizing agent, whose concentration is such that the solution may be adjusted to desired pH values.

9. The process of claim 1, wherein said incorporated support is dried at a temperature in the range of from about 100° to about 200° C. and is calcined at a temperature of from about 400° to about 600° C. in oxidizing atmosphere.

10. A catalyst obtained according to the process of claim 1, wherein said support comprises an alumina matrix having dispersed on the matrix surface or in the matrix mass, or both, an oxide of a metal from group IVB of the periodic table.

11. The catalyst of claim 10, in which said group IVB metal comprises titania in its anatase or rutilium phase or in a mixture of both phases.

12. The catalyst of claimed 10, having a concentration of 8 to 15 wt % of a metal from group VIB of the periodic table; and 1.5 to 5 wt % of a metal from group VIII of the periodic table.

13. The catalyst of claim 10, wherein said catalyst contains $TiO_2$/(metal oxide from group VIB+metal oxide from group VIII) in an atomic ratio of 0.3 to 0.5.

14. The catalyst of claim 10, wherein the catalyst is presulfided.

15. The catalyst of claim 10, wherein the support has a surface area between 180 and 350 $m^2/g$; a pore volume between 0.4 and 1.0 $cm^3/g$; a pore volume distribution with 0–10% pores under 50 Angstroms, 10–80% pores from 50 to 100 Angstroms, 10–60% pores from 100 to 200 Angstroms, 0 to 25% pores from 200 to 500 Angstroms and 0 to 10% pores over 500 Angstroms.

16. The catalyst of claim 10, wherein the support has a cylindrical extrudate form, or extrudates with two or more lobules, and sizes between 1/32 to 1/8 inch nominal diameter.

17. The process of claim 1, wherein said group IVB metal oxide is impregnated into said alumina support under inert conditions.

18. The process of claim 1, wherein said extrudate has four lobules.

19. The process of claim 1, wherein said extrudate comprises delta alumina.

20. A process for the hydrotreating of a middle oil fraction or a heavy oil fraction which comprises contacting said middle oil fraction or said heavy oil fraction with a catalyst prepared according to the process of claim 1, said process being conducted at a temperature of from about 300° C. to about 400° C., a space velocity of from about 0.5 to about 3.0 $hr^{-1}$ and pressures from about 40 to about 100 $Kg/cm^2$.

21. A process for preparing a hydrotreating catalyst for hydrodenitrogenation, hydrodesulfurization and hydrodemetallization of middle and heavy oil fractions which comprises, impregnating a group IVB metal oxide into a support comprising gamma alumina or delta alumina or a mixture thereof by contacting said alumina support in the form of an extrudate having a surface area between 180 and 350 $m^2/g$; a pore volume between 0.4 and 1.0 $cm^3/g$; a pore volume distribution with 0–10% pores under 50 Angstroms, 10–80% pores from 50 to 100 Angstroms, 10–60% pores from 100 to 200 Angstroms, 0 to 25% pores from 200 to 500 Angstroms and 0 to 10% pores over 500 Angstroms, with a solution of a group IVB metal oxide, which is soluble in an organic solvent, to form a group IVB metal oxide-impregnated alumina support, drying and calcining said group IVB metal oxide impregnated alumina support, impregnating said calcined group IVB metal oxide-impregnated support with an aqueous solution of an active metal compound by impregnation of said group IVB metal oxide impregnated alumina support to form an active metal-impregnated alumina support, aging said active metal impregnated alumina support and calcining said active metal impregnated alumina support to form a hydrotreating catalyst.

22. The process of claim 21, wherein said alumina support is gamma alumina.

23. The process of claim 22, wherein said extrudate has two or more lobules.

24. The process of claim 21, wherein said extrudate comprises delta alumina.

* * * * *